H. B. TOBIAS.
PHOTOGRAPHIC FILM PACKAGE.
APPLICATION FILED MAR. 19, 1909.
1,114,204.
Patented Oct. 20, 1914.
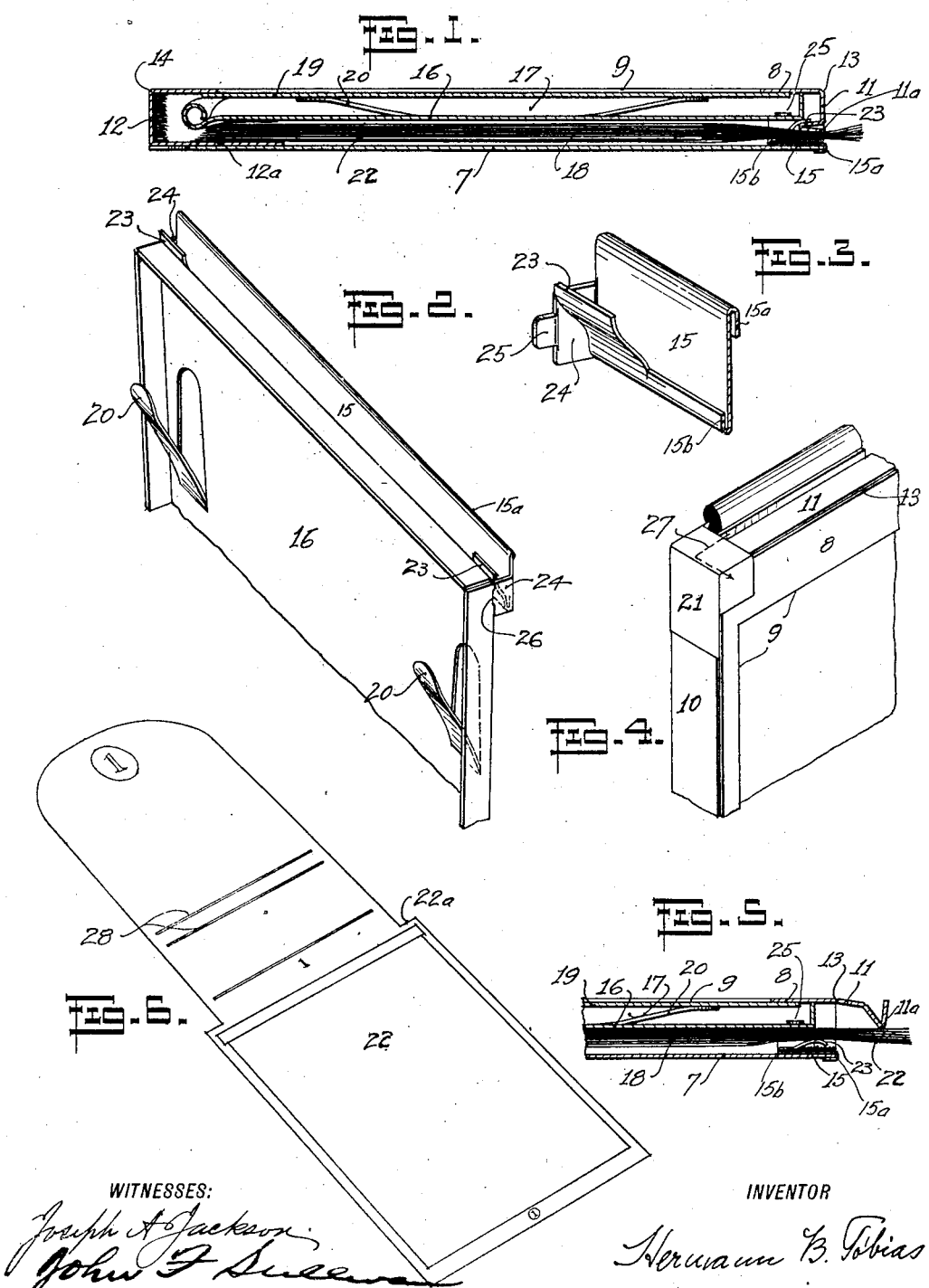
WITNESSES:
INVENTOR
Hermann B. Tobias

UNITED STATES PATENT OFFICE.

HERMANN B. TOBIAS, OF NEW YORK, N. Y.

PHOTOGRAPHIC-FILM PACKAGE.

1,114,204.  Specification of Letters Patent.  Patented Oct. 20, 1914.

Application filed March 19, 1909. Serial No. 484,456.

*To all whom it may concern:*

Be it known that I, HERMANN B. TOBIAS, a subject of the King of Roumania, and a resident of the city, county, and State of New York, have invented certain new and useful Improvements in Photographic-Film Packages, and do hereby declare the following to be a full, clear, and exact description of the same, reference to be had to the accompanying drawings, forming a part of the specification, and to the reference-numbers marked thereon.

My present invention relates to photographic film packages of the class described in Letters Patent No. 839107, granted December 25, 1906, to the Rochester Optical Company, in which the films after being separately exposed are moved to a storage chamber, provided in the package, from whence they are subsequently removed for development, by opening a tucking flap in the bottom of the package.

The great demand for tank development of film plates and for packages adapted to be unloaded in a suitable developing machine, without any exterior disrupting means, or any resort to the dark room; necessitates a package adapted to allow the extraction of the films through the top of same by the aid of the projecting tabs controlling the films within.

The object of my invention, therefore, is to improve film packages of this class by providing means through which the operator may after exposing the films remove the films from the package in a suitable developing machine without the use of any exterior mechanical means of disruption, except those contained in the package, and it is also the object of my invention not to materially increase the manufacturing cost of said package.

Figure 1 is a sectional view of the film package embodying my improvements. Fig. 2 is a perspective view of my improvement detached from the cardboard casing of the package. Fig. 3 is a perspective view of a portion of my improved back frame, showing the flexible stop tongue for the engagement of the film shoulders. Fig. 4 is a perspective view of a part of the top of the present packages. Fig. 5 is a sectional view of my improved package showing the operation of my improvement when films are partly extracted. Fig. 6 shows a view of the film and its back and manipulating tab with the additional designating marks.

The casing of the package is composed of a single piece of card board, or similar light material bent up in a rectangular form with a back 7 and front 8 having a square exposure opening therein 9, sides 10, and upper end 11, also a removable bottom flap 12, both being a continuation of the front, being hinged and made flexible at 13 and 14 by scoring. Tucking flaps 12$^a$ are inserted within the back 7 and to remove films from packages at present in use, said tucking flaps are extracted leaving an opening at the bottom of the pack. As will be seen, this operation must be performed in a dark room to prevent the fogging of the films and within a developing machine, extraction of films through this end is impossible.

The end 11 is so bent as to form a portion 11$^a$ having substantially a V-shape in cross section and by its pressure against the film tabs, coöperates, in excluding the light from the package, with a back frame or plate 15 carrying a light excluding brush and my improvements, as will be hereinafter described.

16 indicates a metal septum supported by the back plate and dividing the interior of the package into two compartments 17 for unexposed films and 18 for exposed films. At 19 is shown the movable follower plate in compartment 17 that closes with the aid of springs 20, integral with the septum, the opening 9 after all films have been exposed and passed to the compartment 18.

End 11 is held in position and protected at its extremities by a piece of paper 21, pasted on the exterior upper corners of the package as shown in Fig. 4.

In the present packages stationary stops are provided to engage the shoulders 22$^a$ of the films 22, said stops being integral with the back plate 15 and supporting the metal septum. My improvement consists in eliminating said stationary stops and replacing same by flexible stop tongues 23.

The back plate 15 being reinforced in its length by flanges 15$^a$ and 15$^b$ can be made of thin flexible metal and therefore while one single film will be stopped against the stop tongues 23, integral with said back plate, the force imparted to said tongues by the extraction of all the films in a body will be sufficient to bend the flexible stop tongues 23 against the back plate 15 thereby allowing a passage for the films as will be hereinafter described. The stop tongues 23 rest upon the part 11ª. They are elastic, and therefore kept in tension by the part 11ª of the projecting end 11 and may be released and allowed to spring back against the back plate 15, when end 11ª is removed, allowing a passage for the films.

The plate 15 is bent at right angles at its two ends as shown at 24, with further projecting tongues 25, which are adapted to enter holes 26 provided in the corners of the septum; said tongues sustaining said septum.

In order to enable the films to be extracted the papers 21 at the corners of the package, are torn along the line 27, loosening the end 11 and when the films 22 are pulled the shoulders 22ª will force the end 11ª upward, and the flexible stop tongues 23 against the back plate 15 and thereby allowing the passage of the films as shown in Fig. 5.

Since the invention is mainly intended to permit the extraction of the films in a suitable developing apparatus additional designating marks 28 on the manipulating tabs are printed to indicate where the tab can be cut and the clip attached. The manner of manipulating the films during exposure will be as in the former patents referred to.

I do not wish to be understood as limiting myself to the exact details of construction hereintofore described or shown in accompanying drawings as it is obvious that these details may be modified without departing from the general principle, since any device permitting the extraction of the films through the top of the package without any external means except those in the package, will come within the scope of this invention.

Having thus described my invention what I claim and desire to secure by Letter Patent is:

1. A photographic film-package, comprising a casing provided with an exposure opening, a septum disposed within said casing and dividing the space therein so as to form compartments, said septum being so shaped as to form a passage between said compartments, a plate connected with said casing for supporting said septum and for normally preventing the removal of films from said casing, and controllable at the will of the operator for preventing the entrance of light into said casing while the films are therein and during their removal therefrom.

2. A photographic film-package, comprising a casing normally closed, said casing being provided with compartments disposed in parallel planes and connected together by a passage, films contained in one compartment and provided with manipulating tabs extending through another compartment and out of the casing through a light-proof manipulating passage; said films being provided with shoulders; and a plate connected with said casing and provided with elastic portion, coöperating with a folded portion of said casing and adapted to engage the said shoulders of the individual film in operation and retain it within said casing and further adapted to be thrust aside by a gentle pressure imparted by an operator when pulling all the films in a body, thus permitting the withdrawal of said films from said casing through said manipulating end.

3. The combination of a casing provided with an exposure opening, a septum disposed within said casing and having such form and size as to divide the space within said casing into two compartments connected by a passage, a supporting member connected with said casing and engaging said septum for the purpose of supporting the latter, said supporting member being provided with means for excluding light from said casing while forming a manipulating passage; and being further provided with flexible stop-tongues for normally checking the progress and preventing the extraction from said casing of an individual film during its manipulation and further capable to permit the extraction of all the films, or a number of the films from the predetermined portion of said casing through said manipulating passage, by a forced flexure of said stop-tongues.

4. A photographic film-package, comprising a casing having an exposure opening, a septum disposed within said casing and so formed and positioned as to divide the space within into compartments, said compartments communicating with each other at their ends, a plate mounted within said casing and provided with means for excluding the entrance of light thereinto while forming a film-tab manipulating passage; said plate being further provided with stop-tongues adapted to co-act with a portion of said casing in checking the movement of any individual film during its manipulation, and to also be subject to flexure by the movement of all or a number of the films in a body, when pulled from the casing by an operator or a mechanical device.

5. A photographic film-package comprising a flat casing provided with an exposure opening, a septum located within said casing and dividing the space therein so as to form two compartments connected at the ends thereof; a tucking flap covering a portion of said casing in a manner as to form a light-proof manipulating passage, otherwise rendering said casing normally closed; and means adjacent to said manipulating passage co-acting with films within the casing, provided with manipulating tabs and with guide markings upon said manipulating tabs to permit the removal of said films from said casing and through said passage by the concerted moving force of all or a number of said films.

In testimony whereof I have signed my name to this specification in the presence of two subscribing witnesses.

HERMANN B. TOBIAS.

Witnesses:
CHAS. F. A. HALL,
L. PERCIVAL SINCLAIR.